US012448744B2

(12) United States Patent
Zumkeller et al.

(10) Patent No.: US 12,448,744 B2
(45) Date of Patent: Oct. 21, 2025

(54) SELF-PROPELLED SWEEPING MACHINE

(71) Applicant: Aebi Schmidt Deutschland GmbH, St. Blasien (DE)

(72) Inventors: Claus Zumkeller, St. Blasien (DE); Martin Ebner, Goerwihl (DE)

(73) Assignee: Aebi Schmidt Deutschland GmbH, St. Blasien (DE)

( * ) Notice: Subject to any disclaimer, the term of this patent is extended or adjusted under 35 U.S.C. 154(b) by 437 days.

(21) Appl. No.: 18/082,899

(22) Filed: Dec. 16, 2022

(65) Prior Publication Data

US 2023/0124476 A1    Apr. 20, 2023

Related U.S. Application Data

(63) Continuation of application No. PCT/EP2021/064795, filed on Jun. 2, 2021.

(30) Foreign Application Priority Data

Jun. 18, 2020   (DE) .......................... 102020116166.2

(51) Int. Cl.
*E01H 1/04*   (2006.01)
(52) U.S. Cl.
CPC .................... *E01H 1/047* (2013.01)
(58) Field of Classification Search
CPC ........ G01F 23/284; A47L 9/2805; A47L 9/19; A47L 9/281; A47L 9/2815;
(Continued)

(56) References Cited

U.S. PATENT DOCUMENTS

2015/0151662 A1* 6/2015 Hetcher .................... B60P 1/60
406/10
2019/0090710 A1* 3/2019 Marcus ..................... A47L 9/12

FOREIGN PATENT DOCUMENTS

CN   111119110 A   5/2020
DE   1 019 337 B   11/1957
(Continued)

OTHER PUBLICATIONS

International Search Report issued by the European Patent Office for International Patent Application No. PCT/EP2021/064795, mailed on Aug. 16, 2021.

*Primary Examiner* — Tom Rodgers
(74) *Attorney, Agent, or Firm* — Myers Wolin, LLC

(57) ABSTRACT

A self-propelled sweeping machine has a sweepings pick-up device and a sweepings collection container. The pick-up device has a pick-up head and a conveying section adjoining the head having an ejection and distribution device opening into an interior of the collection container. Sweepings picked up from the traffic surface by the pick-up device can be distributed by the ejection and distribution device, with the formation of a sweepings surface, in the interior of the collection container. Also provided is a filling level sensor, which is configured as a radar sensor and scans the interior of the sweepings collection container, and an evaluation unit which interacts with the filling level sensor. A distance measured between the filling level sensor and the sweepings surface allows for the degree of filling of the sweepings collection container to be determined in the evaluation unit and to be output on a display or signal unit.

8 Claims, 3 Drawing Sheets

(58) Field of Classification Search
CPC .. A47L 11/4019; A47L 11/403; A47L 7/0071;
E01H 1/02–108
USPC .......................................... 15/349, 347, 78
See application file for complete search history.

(56) References Cited

FOREIGN PATENT DOCUMENTS

| | | |
|---|---:|---:|
| DE | 2040 542 A1 | 2/1972 |
| DE | 7216571 U | 8/1972 |
| DE | 86 13 829 U1 | 9/1986 |
| DE | 25 60 675 C2 | 9/1993 |
| DE | 44 15 662 A1 | 11/1995 |
| DE | 102015003916 A1 | 9/2016 |
| EP | 0 164 315 A2 | 12/1985 |
| EP | 0 291 844 A2 | 11/1988 |
| EP | 3 605 031 A1 | 2/2020 |
| GB | 2571624 A | 9/2019 |
| WO | 2010/043406 A1 | 4/2010 |
| WO | 2019/220467 A1 | 11/2019 |

\* cited by examiner

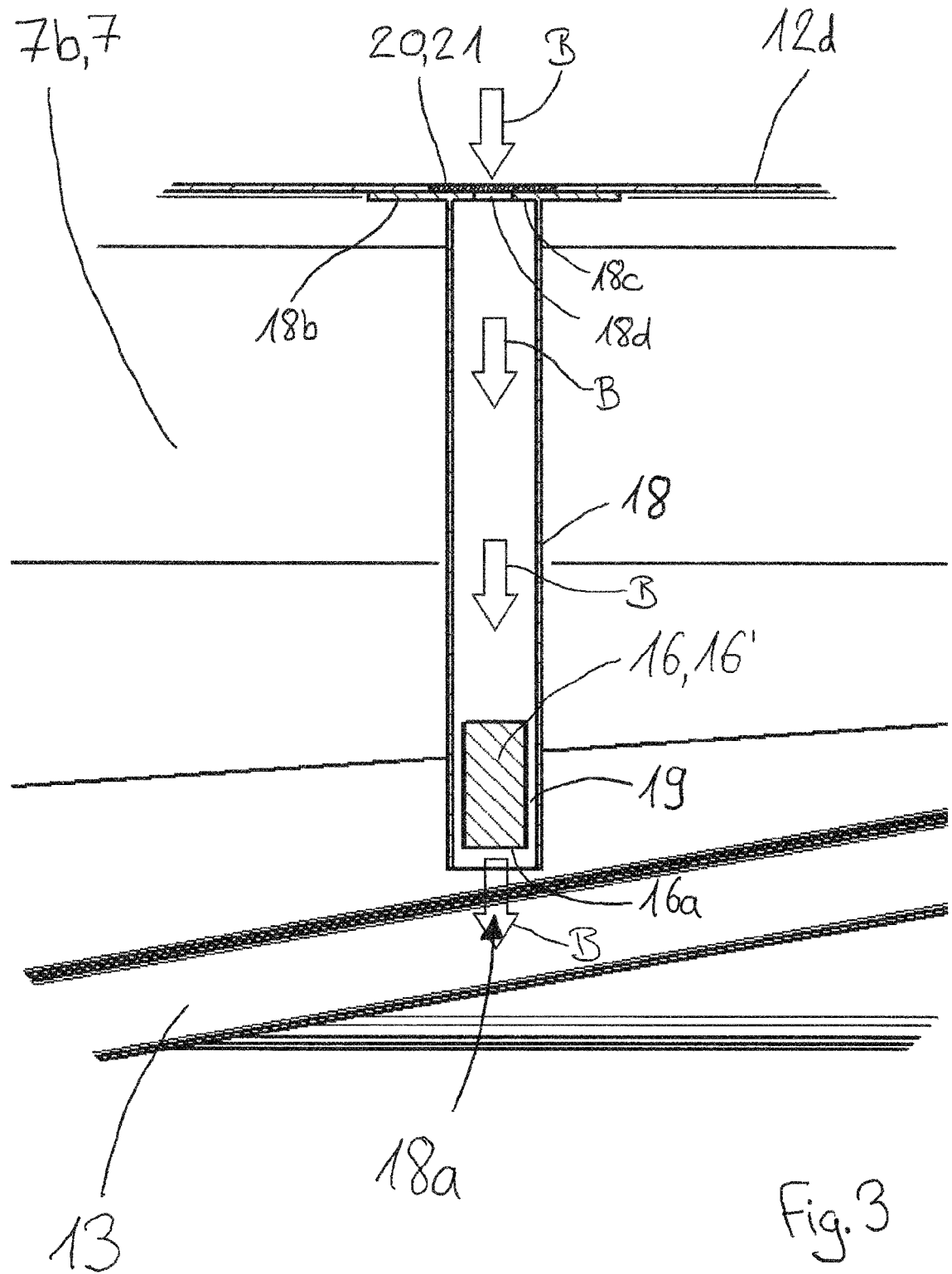

SELF-PROPELLED SWEEPING MACHINE

CROSS REFERENCE TO RELATED APPLICATIONS

This application is a continuation under 35 U.S.C. § 120 of International Application PCT/EP2021/064795, filed Jun. 2, 2021, which claims priority to German Application No. 102020116166.2, filed Jun. 18, 2020, the contents of each of which are incorporated by reference herein.

FIELD OF THE INVENTION

The present invention relates to a self-propelled sweeping machine for intake of debris from a traffic surface, especially a street-sweeping machine, comprising a debris-intake device and a debris-collecting hopper, wherein the debris intake device comprises an intake head and a conveyor section attached thereto with an ejection and distribution device opening into an inner space of the debris-collecting hopper, by means of which the debris taken in by the debris-intake device from the traffic surface can be distributed in the inner space of the debris-collecting hopper with formation of a debris surface. In particular, the present invention relates to such a self-propelled sweeping machine, in which the debris-collecting hopper is equipped with a filled-level sensor.

BACKGROUND

Sweeping machines mentioned in the introduction, which typically are designed as pneumatically intaking sweeping machines—equipped with a pneumatic conveyor section (suction shaft)—or as mechanically intaking sweeping machines—equipped with a mechanical conveyor section (e.g. conveyor belt)—or else as sweeping machines of hybrid construction, have proved effective in daily practice for many years. They are also mentioned in numerous publications. Reference in this context is to be made, for example, to WO 2010/043406 A1, EP 291 844 A2, DE 86 13 829 U1, EP 164 315 A2, DE 20 40 542 A, DE 72 16 571 U1, DE 25 60 675 C2 and DE 10 19 337 B. The ejection and distribution device therein ensures that the debris is distributed in the debris-collecting hopper in the most uniform possible manner over its floor surface, so that ideally the entire available volume of the debris-collecting hopper is used for uniform intake of debris and thus the capacity of the debris-collecting hopper can be exhausted optimally.

In the course of sweeping operation, the debris-collecting hopper becomes increasingly filled with debris. If the debris-collecting hopper becomes full, the sweeping operation is suspended and the machine travels to a landfill—which may be nearby or further away—in order to empty the debris-collecting hopper. For this purpose, it is eminently important that the sweeping operation be ended in timely manner; otherwise the debris-collecting hopper will become overfilled, often leading to clogging or such compaction of the debris that it "becomes stuck" in the debris-collecting hopper and so subsequent unloading of the debris-collecting hopper is possible only with great difficulty as well as much manual effort and time.

A generic, pneumatically intaking, self-propelled sweeping machine, which is equipped with a filled-level sensor for prevention of overfilling of the debris-collecting hopper, is known from CN 111 119 110 A. The filled-level sensor is designed as a turning-resistance sensor, which is suspended on the ceiling of the debris-collecting hopper and which detects when a predetermined filled level has been reached by the fact that a rotor is braked (by the accumulated debris). Hereby shutdown of the suction fan is tripped; and the sweeping machine travels to a landfill.

In order to prevent overfilling of the debris-collecting hopper and despite that—to avoid efficiency-impairing trips to a landfill with a debris-collecting hopper that is only partly filled—to utilize its capacity as well as possible, it has become common practice in sweeping machines having a debris-collecting hopper equipped with a coarse-material input hatch for the operator occasionally to exit the driver's cab and climb the structure in order to estimate the filled level via the coarse-material input hatch. However, this is possible only by shutting down the debris-intake device for a certain time, since the distribution of the debris by means of the ejection and distribution device requires intensive whirling up and swirling, especially of lightweight and fine debris, in the debris-collecting hopper, whereby the viewing conditions in the debris-collecting hopper are very murky.

The method used in some cases—additionally or alternatively—of estimating the filled level of the debris-collecting hopper—on the basis of an assumed mean density—from the measured axial load is indeed possible during sweeping operation; however, it is associated with quite considerable uncertainties, because the density of the debris may be extremely different depending on its composition (leaves, sand, grit, common mixed debris, etc.) and moisture content. Thus it is neither possible in this way to rule out overfilling with certainty nor to ensure optimal efficiency of the sweeping operation.

Incidentally, the possible use of a filled-level sensor in a sweeping machine has already been mentioned (somewhat cryptically) in the patent literature. And, in fact, DE 10 2015 003 916 A1, according to which an intermediate hopper is disposed in the region of the intake head of a sweeping machine for temporary intermediate storage of coarse dirt that temporarily cannot become airborne—and thus cannot be transported to the debris-collecting hopper—i.e. due to reduced suction power of the suction fan, mentions the possibility of monitoring the filled level of just such an intermediate hopper by means of at least one sensor; if the intermediate hopper is full, the power of the suction fan is stepped up in order to empty the intermediate hopper into the debris-collecting hopper. Sensors operating contactlessly (optical, ultrasonic, inductive, capacitive) or with contact (spring-loaded probes) are mentioned for this purpose.

Further known—see the ARIAMATIC 240 "self-propelled urban vacuum cleaner" of TSM Technological Systems by Moro Srl, IT, 33080 Fiume Veneto and the associated WO 2019/220467 A1—is a waste vacuum cleaner capable of autonomously following an operator and equipped with a removable collecting hopper, which the operator manually guides the intake head communicating pneumatically via a hose with the waste-collecting hopper to the waste to be vacuumed up, in order to vacuum up discrete wastes, such as cans, bottles, cups, cigarette packets, cigarette butts, dog feces, etc. By means of a laser scanner, it is recognized when the maximum filled level of the waste-collecting hopper has been reached; the drive system is then stopped to permit the operator to empty the debris-collecting hopper on the spot and to exchange it for an empty hopper.

The prior art further includes route optimization for street-sweeping machines (GB 2 571 624 A) and the measurement of filled level and/or of limit level of a fill material in a hopper by means of a radar sensor (EP 3 605 031 A1).

SUMMARY

An objective of the present invention is to create a remedy for the dilemma, explained hereinabove, that exists—between the best possible utilization of the capacity of the debris-collecting hopper and the risk that it will become overfilled—in sweeping machines that must be driven to a landfill in order to empty the debris-collecting hopper, and to provide a practical sweeping machine with which the sweeping operations can be performed particularly efficiently.

In some embodiments, this objective is achieved by a filled-level sensor designed as a radar sensor in a generic sweeping machine and scanning the inner space of the debris-collecting hopper in the region of a scan cone, as well as by an evaluating unit interacting with this. In this way, the degree of filling of the debris-collecting hopper with debris can be determined in the evaluation unit via the distance between the filled-level sensor and the debris surface in the scan cone as measured contactlessly by the filled-level sensor and can be output thereby to a display and/or signaling unit. Furthermore, the debris-collecting hopper has a leaf screen that is impassable for coarse debris and that subdivides the inner space of the debris-collecting hopper into a debris region and an exhaust-air region, wherein the filled-level sensor is provided in the exhaust-air region and in the region of the scan cone scans the debris region of the inner space of the debris-collecting hopper through the leaf screen.

By implementation of embodiments of the present invention, it is possible in surprisingly simple manner to provide a sweeping machine of the generic type with which efficiency not possible heretofore can be achieved with the sweeping operations. This is so because the precise knowledge available at any time—during active sweeping operation, i.e. while the sweeping machine is traveling and the debris-intake device is switched on—concerning the degree of filling of the debris-collecting hopper with debris (filled level of the debris) makes it possible to avoid on the one hand unnecessary trips to a landfill with non-optimally used capacity of the sweeping machine and on the other hand the additional extra time spent on clearing of "stuck conditions" of the debris—caused by overfilling of the debris-collecting hopper—or on interruptions of the sweeping operation for visual inspection of the filled level. Due to the arrangement of the filled-level sensor in the exhaust-air region "behind" a leaf screen, which typically comprises a grid with a mesh width of approximately 0.5 to 1 cm and prevents coarse and relatively lightweight debris (e.g. paper, leaves, pieces of foil, beverage cans) from entering the exhaust-air region and exiting the debris-collecting hopper in this way, the filled-level sensor can be protected from damaging collisions with swirling coarse debris, thus contributing to the reliability and useful life of the filled-level sensor.

This fact that data suitable for continuous and accurate determination of the degree of filling of the debris-collecting hopper with debris can be obtained during active sweeping operation by a radar sensor used in the interior of a debris-collecting hopper is extremely surprising. In fact, radar is typically used in aeronautics and the automobile sector precisely for recording moving objects. Against this background, it is contrary to all expectations to use, in the interior of the debris-collecting hopper, a radar sensor in a generic sweeping machine during sweeping operation for "quasi-static" measurement of the current filled level, since it would be expected that the swirling, stirred-up debris would distort the radar signal so much that the measurement of the distance between filled-level sensor and surface of the (already) deposited debris would be impossible. Surprisingly, the exact opposite is the case because, by implementation of embodiments of the invention precisely by the use of a radar sensor (for example, a commercial FMCW radar sensor of Baumer GmbH, DE-61169 Friedberg), the degree of filling of the debris-collecting hopper with debris during active sweeping operation can be determined continuously and exactly.

Expediently, this filled-level sensor is disposed in the upper region of the debris-collection hopper (especially in the upper half or in the upper third relative to a hopper height of the debris-collecting hopper) and the inner space of the debris-collecting hopper being scanned (by the filled-level sensor in the region of the scan cone) lies underneath the filled-level sensor. This takes into account the circumstance that, during sweeping operation, the debris is first accumulated by gravity in the lower region of the debris-collecting hopper, where it forms a debris surface, which then becomes increasingly higher with increasing loading of the debris-collecting hopper with debris. Due to the positioning of the filled-level sensor in the upper region of the debris-collecting hopper and the scanning of the interior space situated underneath it by the filled-level sensor, it is therefore possible to ensure that the filled-level sensor is not already buried at relatively low filled levels by debris accumulated in the debris-collecting hopper. Although it is obvious for the person skilled in the art, it will be explicitly mentioned at this place that the expressions "upper region", "upper half", "upper third", "lower region" and "situated underneath" refer to the direction of action of gravity relative to the debris-collecting hopper during generic sweeping operation and that the hopper height is determined by the extent, in the direction of action of gravity, of the debris-collecting hopper during generic sweeping operation.

Within the scope of embodiments of the present invention, what is understood by the scan cone of the filled-level sensor is a straight cone (typically a circular cone) defined by an opening angle and a cone axis (also known as scan axis), which can be scanned (recorded) in sensory manner by the filled-level sensor.

The present invention is suitable for various sweeping-machine constructions. In particular, it can be applied in pneumatically intaking sweeping machines, which are equipped with a pneumatically operating conveyor section, in mechanically intaking sweeping machines, which are equipped with a mechanically operating conveyor section, and also in sweeping machines of hybrid construction.

According to an advantageous further embodiment of the invention, the sweeping machine comprises (at least) one suction fan, by means of which a partial vacuum can be created in the inner space of the debris-collecting hopper and which removes the exhaust air from the debris-collecting hopper. In pneumatically intaking sweeping machines, this suction fan may be identical with that which also creates the pressure drop required for conveying the debris through the pneumatic conveyor section (suction shaft), wherein the corresponding air stream—if applicable in cooperation with baffle and/or guide plates to be further associated with the ejection and distribution device—also contributes to distribution of the debris arriving in the debris-collecting hopper over the floor surface of the debris-collecting hopper. In mechanically intaking sweeping machines, the suction fan in question may be used not only for removal of exhaust air from the debris-collecting hopper, but also as a blower assembly, by the fact that a (partial) air stream sucked from the collecting hopper is also directed specifically to the mouth of the ejection and distribution device (e.g. to a kind of ejection table), where it ensures that the debris arriving via the mechanical conveyor section in the debris-collecting hopper is blown away to be distributed over the floor surface of the debris-collecting hopper. Alternatively or in addition to the blower assembly, a rotating whirler assembly could also be used for this purpose, by the fact that the debris arriving via the mechanical conveyor section in the debris-collecting hopper first reaches a kind of rotating whirler plate or rotating whirler roll and then is distributed by rotational or centrifugal force over the floor surface of the debris-collecting hopper.

If—in the sense explained in the foregoing—the sweeping machine is equipped with a suction fan generating a partial vacuum (relative to the surroundings) in the debris-collecting hopper, then, in yet another particularly advantageous further embodiment of the invention, the debris-collecting hopper is provided with a wall having a penetration designed such that ambient air (possibly guided by a sleeve surrounding the radar sensor laterally or by another air-guiding device) can flow or does flow through the penetration along the filled-level sensor into the debris-collecting hopper when a partial vacuum is created in the inner space of the debris-collecting hopper. The "purge stream" then created and flowing along the filled-level sensor is simultaneously able to prevent contaminants such as swirling debris in particular from depositing on the filled-level sensor and either impairing the functioning as intended of the filled-level sensor there and/or of necessitating laborious manual cleaning of the filled-level sensor.

For this purpose, the wall penetration mentioned in the foregoing and used for inflow of a "purge stream" into the debris-collecting hopper may be created in the wall in question at the shortest possible distance from the radar sensor, specifically when the radar sensor is disposed close to a wall of the debris-collecting hopper. If this is the upper wall of the hopper, the said penetration is expediently covered by means of a hood or the like to prevent ingress of rain. Depending on the structural details of the debris-collecting hopper, it may nevertheless be particularly advantageous when the wall penetration (e.g. in a side wall or the end wall of the debris-collecting hopper) is disposed at a spatial distance from the radar sensor, wherein a duct conveying the purge-air stream extends in this case from the wall opening to the radar sensor, where it passes into the air-deflecting device mentioned hereinabove. It is then particularly favorable when a connecting cable (provided for the power supply and/or data transmission) of the radar sensor is routed in the duct, since in this way it is protected from damage by swirling debris.

Quite particularly preferably, the filled-level sensor is then positioned such that the leaf screen is situated within a blind region of the radar sensor, wherein the blind region of a radar sensor is to be regarded as any near region in which a distance measurement is not possible, since the transit time of a radar signal reflected within the blind region is so short that it cannot be recorded and processed instrumentally. By the arrangement of the leaf screen within just this blind region of the radar sensor, it is possible to ensure that the radar signal reflected at the leaf screen cannot falsify the measurement of the distance to the debris surface. In this connection, the purge stream (see above) explained hereinabove, formed at the filled-level sensor and flowing along it also acts particularly favorably, since it is additionally able to prevent clogging of the leaf screen with coarse debris in the region of intersection with the scan cone of the filled-level sensor, thus contributing to the accuracy and reliability of the measurement.

According to another preferred further embodiment of the invention, the sweeping machine has a driver's cab in which the display and/or signaling unit is disposed. In this way, an operator occupying the driver's cab is able to read the current filled level easily and comfortably during sweeping operation and on this basis to decide how long he may still continue sweeping operation and when he has to interrupt it in order to empty the debris-collecting hopper. A sophisticated choice of route made possible by this information, such that empty trips are minimized, may contribute further to the excellent efficiency of the sweeping machine or of the sweeping operations possible with it.

Also preferably, current position data (e.g. GPS coordinates), can be assigned to the sweeping machine, and the sweeping machine comprises a sweeping-route planning device that processes the current position data, wherein the sweeping-route planning device communicates in data-transmission mode with the evaluation unit and data transmitted by the evaluation unit can be taken into consideration during sweeping-route planning. In this way, it may be ensured that the current filled level and/or its progress in time, for example, may be taken into consideration during planning of the further course of the current sweeping route, thus ensuring dynamic sweeping-route planning, in order thereby to minimize unproductive trips to the landfill and thus to increase the efficiency of operation of the sweeping machine.

According to another preferred further development, the wall of the debris-collecting hopper is provided at least in the region of intersection with the scan cone with a flat bottom plate and the filled-level sensor is aligned such that its scan axis is inclined at less than 5°, particularly preferably less than 3°, to the local normal to the surface of the bottom plate. In this way it is possible to ensure that (when the debris-collecting hopper is empty) the radar signal reflected from the bottom plate can be captured by the filled-level sensor and thus the distance from the filled-level sensor to the bottom plate can be measured when the debris hopper is completely empty, so that, even in this operating situation, the degree of filling of the debris-collecting hopper with debris can be determined in the evaluation unit and output by this to a display and/or signaling unit. The signal when the debris-collecting hopper is empty may then also be used for regular or occasional calibration of the measuring system comprising the radar sensor and the evaluation unit.

BRIEF DESCRIPTION OF THE DRAWING

An exemplary embodiment of the invention will be explained in more detail hereinafter on the basis of the drawing, wherein FIG. 3 shows an enlarged detail of the region of the filled-level sensor according to FIG. 2.

DETAILED DESCRIPTION OF THE PREFERRED EMBODIMENTS

Figure 1:
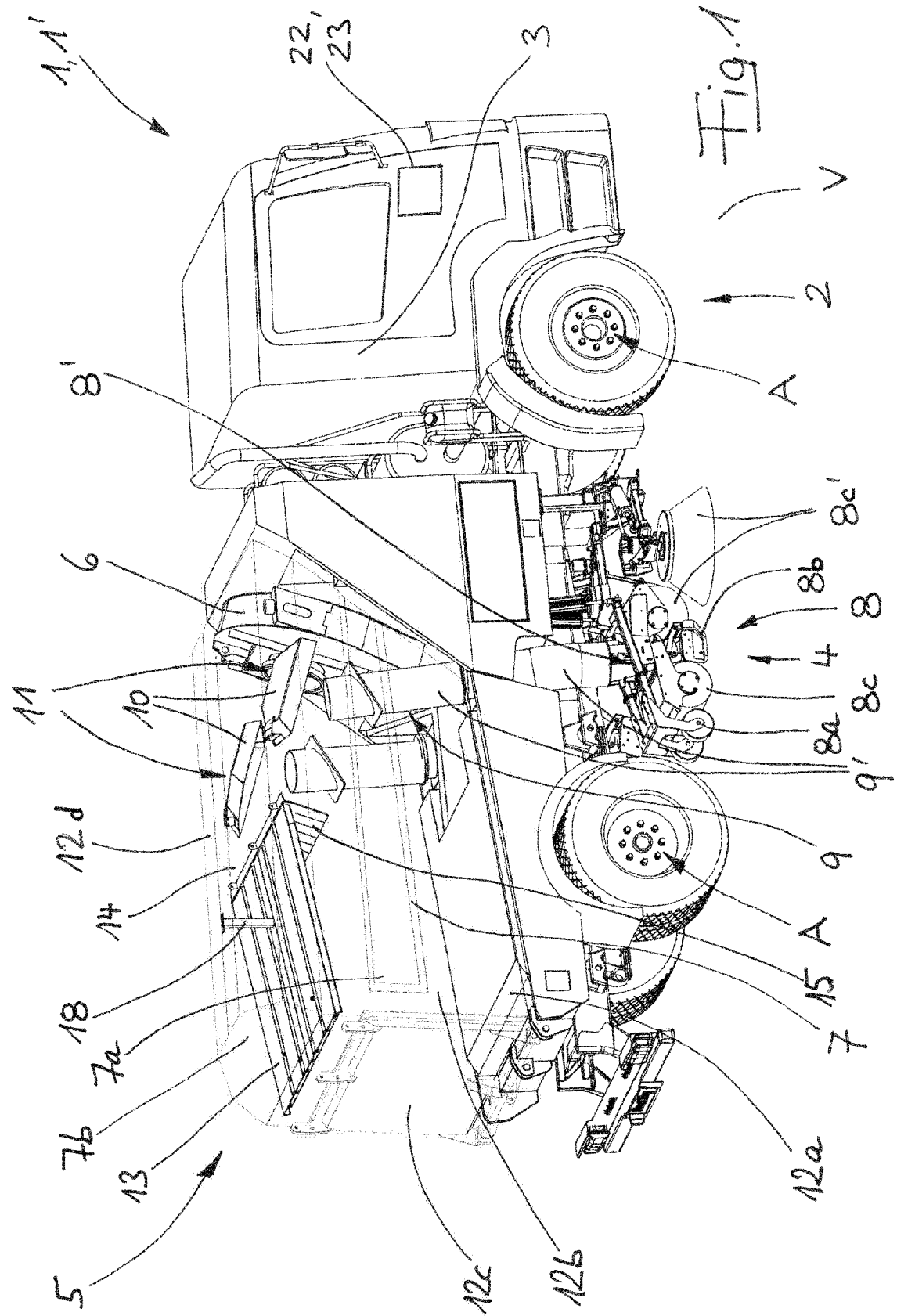
FIG. 1 shows an inventive sweeping machine in partly transparent inclined view.
Figure 2:
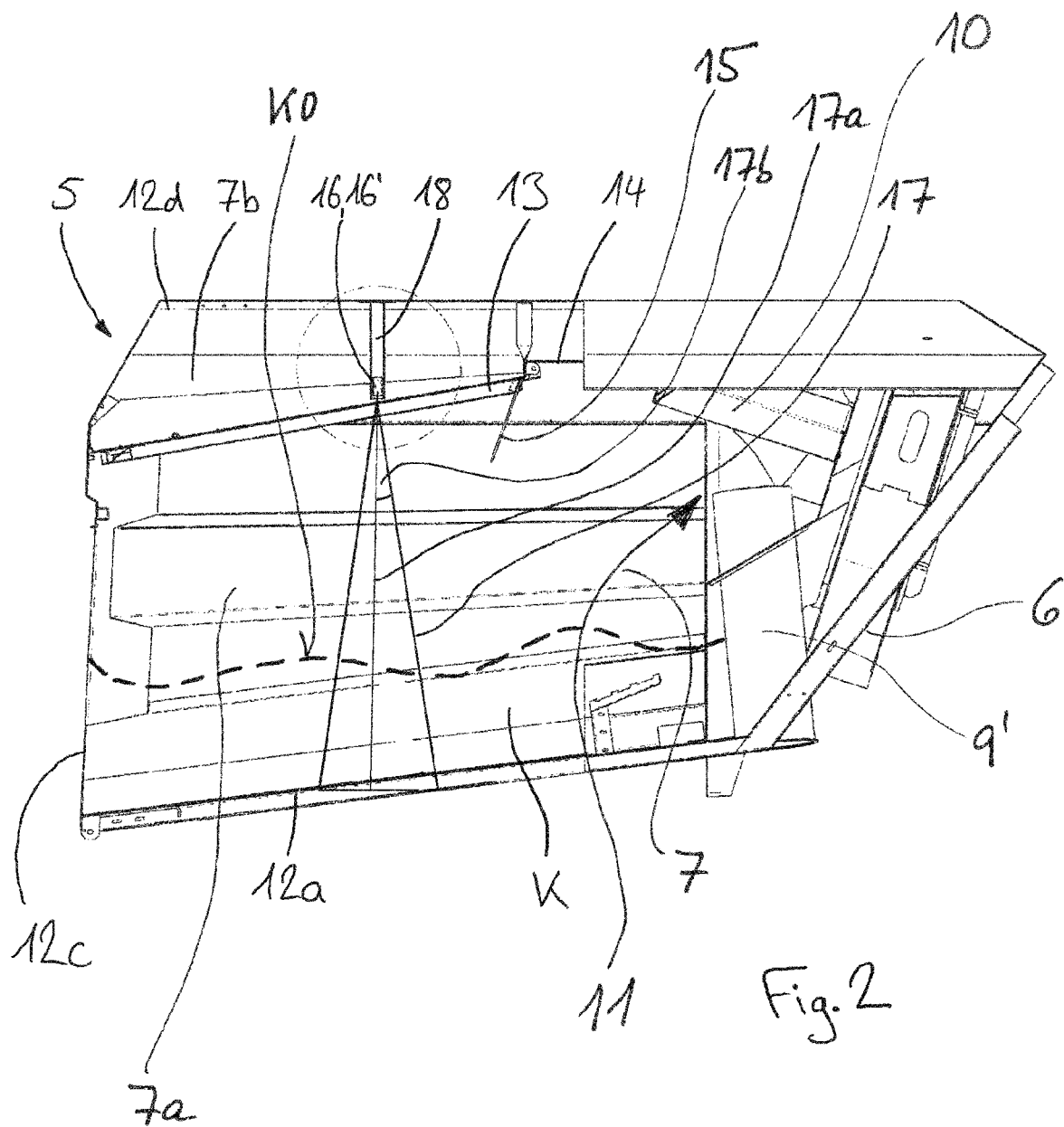
FIG. 2 shows the debris-collecting hopper together with filled-level sensor and leaf screen from FIG. 1 in a vertical sectional view.

The self-propelled sweeping machine 1 for intake of debris K from a traffic surface V illustrated in partly transparent oblique view in FIG. 1 as well as partly in vertical sectional views in FIGS. 2 and 3 is a pneumatically intaking street-sweeping machine 1'. Street-sweeping machine 1' has a two-axle truck chassis 2 together with driver's cab 3 as well as a debris-intake device 4, a debris-collecting hopper 5 and a suction fan 6, by means of which a partial vacuum can be created in the inner space 7 of debris-collecting hopper 5.

Debris-intake device 4 comprises two intake heads 8 disposed between the two axles A on oppositely facing sides of truck chassis 2. Each intake head 8 has a suction mouth 8b, which is mounted in an associated vertically adjustable suction carriage 8' and in lowered condition (illustrated in FIG. 1) is braced by means of support wheels 8a on traffic surface V, which carriage also carries an associated, rotationally driven roller brush 8c. Further rotatable (feed) brushes 8c' are suspended on chassis 2.

A conveyor section 9—designed as a pneumatically operating conveyor section 9'(suction shaft)—is connected to each suction mouth 8b and respectively has an ejection and distribution device 11 opening into debris-collecting hopper 5 and respectively comprising a baffle plate 10. By means of ejection and distribution devices 11, the debris K taken in by debris-intake device 4 from traffic surface V can be distributed in debris-collecting hopper 5 with formation of a debris surface KO.

Debris-collecting hopper 5 (which can be tilted for emptying purposes) has a wall 12, which comprises a flat bottom plate 12a, two side walls 12b, a swivelable tail hatch 12c and an upper part 12d. A leaf screen 13 disposed in debris-collecting hopper 5 and impassable for coarse debris K subdivides, in combination with an intermediate wall 14, inner space 7 of the debris-collecting hopper into a debris region 7a and an exhaust-air region 7b. Suction fan 6 communicates via exhaust-air region 7b with inner space 7 of debris-collecting hopper 5.

If a partial vacuum is created in inner space 7 of debris-collecting hopper 5 by means of suction fan 6, debris K (from traffic surface V) can be sucked together with an air stream through intake head 8 and conveyed through the two conveyor sections 9 into debris-collecting hopper 5. There debris K (together with the air stream) impinges on baffle plates 10 and in the process—supported by a correspondingly aligned rubber curtain 15 causing a further flow deflection—is deflected in its direction of movement obliquely downward toward bottom plate 12a or tail hatch 12c.

Whereas particularly heavy debris K (debris with relatively high density) then falls smoothly toward bottom plate 12a and thus is accumulated more or less underneath baffle plates 10, particularly lightweight debris K is still carried somewhat further by the air stream before it is deposited and accumulated in a region further removed from baffle plates 10. Swirling lightweight coarse debris K is prevented by leaf screen 13 from entering into exhaust-air region 7b. Only the air stream and fine debris K, for which leaf screen 13 is passable and which is filtered out from the air stream further downstream, are able to pass leaf screen 13 and be conveyed via exhaust-air region 7b toward suction fan 6.

In the process, debris surface KO (illustrated by a dashed line in FIG. 2) is formed first in the lower region of debris-collecting hopper 5 and with increasing loading of debris-collecting hopper 5 with debris K is shifted toward the upper region of debris-collecting hopper 5. Although debris surface KO progresses irregularly over debris-collecting hopper 5 and (as illustrated by a dashed line in FIG. 2) may be manifested in particular as a more or less "hilly" structure, the location of debris surface KO in the region approximately centrally under leaf screen 13 has proved to be extremely informative for the (volumetric) degree of filling of debris-collecting hopper 5.

In exhaust-air region 7b of debris-collecting hopper 5, i.e. in flow direction "behind" leaf screen 13 and thus protected from swirling debris K, a filled-level sensor 16 designed as radar sensor 16' and scanning inner space 7, situated underneath it, of debris-collecting hopper 5 through lead screen 13 is disposed in the region of a scan cone 17. This scan cone 17 extends along a scan axis 17a and has an opening angle 17b. Filled-level sensor 16 is then aligned such that its scan axis 17a is inclined at less than 5° relative to the local normal to the surface of bottom plate 12a. By filled-level sensor 16 designed as radar sensor 16', a distance—equal to the mean if necessary—between filled-level sensor 16 and debris surface KO can be measured contactlessly in scan cone 17 (based on the principle, common in radar technology and for this reason not further explained here, of reflection of an emitted radar signal at a surface to be scanned and determination of the time of transit of the radar signal from the instant of emission until the instant of detection of the reflected radar signal).

For technical reasons, no distance measurement is possible in this way within a certain near region (blind region) of scan cone 17 of filled-level sensor 16. Filled-level sensor 16 and leaf screen 13 are so disposed relative to one another that leaf screen 13 intersects scan cone 17 of filled-level sensor 16 within the blind region.

As is evident in particular in FIG. 3—an enlargement of the region enclosed by a dot-dash circle in FIG. 2—filled-level sensor 16 is received in a tubular sensor sleeve 18 provided at its end turned toward the inner space of the debris-collecting hopper with an opening 18a and for this purpose is fixed by suitable fastening means (not illustrated in the drawing).

This sensor sleeve 18 is securely joined via a flange 18b with upper part 12d of the wall of debris-collecting hopper 5 and on the flange side has a sleeve-end penetration 18d in a flange end 18c that partly closes sensor sleeve 18. An annular gap 19 (bridged over only by the fastening means) extends between filled-level sensor 16 and the cylindrical inside face of sensor sleeve 18.

Through a penetration 21 provided in hopper ceiling 12d (and covered with a grid 20) as well as the sleeve-end penetration 18d, ambient air (when partial vacuum is created in inner space 7 of debris-collecting hopper 5) is able to flow through sensor sleeve 18 and annular gap 19 by passing along filled-level sensor 16 into debris-collecting hopper 5 and in the process to create a purge stream, especially in the region of the front end 16a of filled-level sensor 16 (turned toward inner space 7 of debris-collecting hopper 5). The flow pattern created in the process is indicated schematically by block arrows B in FIG. 3. By the fact that the front end 16a of filled-level sensor 16 turned toward inner space 7 of debris-collecting hopper 5 is set back relative to the end of sensor sleeve 18 (turned toward inner space 7 of debris-collecting hopper 5), the protection of filled-level sensor 16 from unwanted mechanical effect is additionally promoted.

In cooperation with an evaluating unit 22, it is possible to determine the degree of filling of debris-collecting hopper 5 with debris K from the (mean) distance between filled-level sensor 16 and debris surface KO in scan cone 17 and to output it in a display and signaling unit 23 disposed in the driver's cab 3.

Brief strong surges of the degree of filling of debris-collecting hopper 5 output in display and signaling unit 23 (for example, caused by "to and from slopping" of fluidizable debris K within debris-collecting hopper 5 during cornering and/or during travel over ground irregularities) can be prevented or at least reduced by means of the use of suitable signal filters or by averaging. By means of suitable signal filters, it is possible to filter out even large measured distance values that are not very plausible, for example such as may be caused by undesired multiple reflection of the radar signal within debris-collecting hopper 5.

By recording the particularly "informative" region under leaf screen 13, it is possible to ensure that the use of a single filled-level sensor 16 is already sufficient to determine the degree of filing of debris-collecting hopper 5 reliably and informatively. Of course, it is also conceivable to dispose several filled-level sensors 16 in debris-collecting hopper 5 to record the location of debris surface KO in various regions of debris-collecting hopper 5, so that an even more accurate picture of the degree of filling of debris-collecting hopper 5 as well as the distribution of debris K within debris-collecting hopper 5 can be obtained.

What is claimed is:

1. A self-propelled sweeping machine (1) for intake of debris (K) from a traffic surface (V), especially a street-sweeping machine (1'), comprising a debris-intake device (4) and a debris-collecting hopper (5) having a wall (12) and a filled-level sensor (16) wherein the debris-intake device (4) comprises an intake head (8) and a conveyor section (9) attached thereto with an ejection and distribution device (11) opening into an inner space (7) of the debris-collecting hopper (5), by means of which the debris (K) taken in by the debris-intake device (4) from the traffic surface (V) can be distributed in the inner space (7) of the debris-collecting hopper (5) with formation of a debris surface (KO), characterized by the design of the filled-level sensor (16) as a radar sensor (16') scanning the inner space (7) of the debris-collecting hopper (5) in the region of a scan cone (17) as well as by an evaluation unit (22) cooperating with the radar sensor (16'), wherein, via a distance between the filled-level sensor (16) and the debris surface (KO) in the scan cone (17), measured contactlessly by the filled-level sensor (16), the degree of filling of the debris-collecting hopper (5) with debris (K) can be determined in the evaluation unit (22) and output by it to a display and/or signaling unit (23), wherein further the debris-collecting hopper (5) has a leaf screen (13) that is impassable for coarse debris (K) and that subdivides the inner space (7) of the debris-collecting hopper (5) into a debris region (7a) and an exhaust-air region (7b), wherein the filled-level sensor (16) is provided in the exhaust-air region (7b) and the debris region (7a) of the inner space (7) of the debris-collecting hopper (5) is scanned in the region of the scan cone (17) through the leaf screen (13).

2. The sweeping machine (1) of claim 1, wherein the conveyor section (9) is designed as a pneumatically operating conveyor section (9').

3. The sweeping machine (1) of claim 1, wherein the conveyor section (9) is designed as a mechanically operating conveyor section and the ejection and distribution device (11) comprises a rotating whirler assembly and/or blower assembly.

4. The sweeping machine (1) of claim 1, wherein the sweeping machine (1) comprises a suction fan (6), by means of which a partial vacuum can be created in the inner space (7) of the debris-collecting hopper (5).

5. The sweeping machine (1) of claim 4, wherein the wall (12) of the debris-collecting hopper (5) has an opening (21) designed such that ambient air can flow through the opening (21) along the filled-level sensor (16) into the debris-collecting hopper (5).

6. The sweeping machine (1) of claim 1, wherein the wall (12) of the debris-collecting hopper (5) is provided at least in the region of intersection with the scan cone (17) of the filled-level sensor (16) with a flat bottom plate (12a), wherein the filled-level sensor (16) is aligned such that its scan axis (17a) is inclined at less than 10° to the local normal to the surface of the bottom plate (12a).

7. The sweeping machine (1) of claim 1, wherein the sweeping machine (1) has a driver's cab (3), in which the display and/or signaling unit (23) is disposed.

8. The sweeping machine (1) of claim 1, wherein current position data can be assigned to the sweeping machine (1), and the sweeping machine (1) comprises a sweeping-route planning device that processes the current position data, wherein the sweeping-route planning device communicates in data-transmission mode with the evaluation unit (22) and data transmitted by the evaluation unit (22) can be taken into consideration during sweeping-route planning.

* * * * *